US006172324B1

(12) United States Patent
Birx

(10) Patent No.: US 6,172,324 B1
(45) Date of Patent: Jan. 9, 2001

(54) PLASMA FOCUS RADIATION SOURCE

(75) Inventor: Daniel Birx, Oakley, CA (US)

(73) Assignee: Science Research Laboratory, Inc.

( * ) Notice: Under 35 U.S.C. 154(b), the term of this patent shall be extended for 0 days.

(21) Appl. No.: 09/352,571

(22) Filed: Jul. 13, 1999

Related U.S. Application Data

(63) Continuation-in-part of application No. 09/187,436, filed on Nov. 6, 1998, now Pat. No. 6,084,198, which is a continuation-in-part of application No. 08/847,434, filed on Apr. 28, 1997, now Pat. No. 5,866,871.

(51) Int. Cl.[7] .................................................... B23K 10/00

(52) U.S. Cl. ............................... 219/121.57; 219/121.48; 219/121.54; 219/121.52; 378/119; 315/111.31

(58) Field of Search ......................... 219/121.48, 121.52, 219/121.54, 121.57, 121.59, 121.36; 378/34, 119; 313/231.31; 315/111.31

(56) References Cited

U.S. PATENT DOCUMENTS 3,150,483 * 9/1964 Mayfield et al. ..................... 60/35.5
3,232,046 * 2/1966 Meyer .................................. 60/35.5
3,276,176 * 10/1966 Jonsson et al. ........................ 52/309
3,961,197 * 6/1976 Dawson .............................. 250/493
3,969,628 * 7/1976 Roberts et al. ...................... 250/402
4,203,393 * 5/1980 Giardini ............................ 123/30 D
4,364,342 * 12/1982 Asik ................................ 123/143 B
4,369,758 * 1/1983 Endo .................................. 123/620
4,504,964 * 3/1985 Cartz et al. .......................... 378/119
4,536,884 * 8/1985 Weiss et al. .......................... 378/119

* cited by examiner

*Primary Examiner*—Mark Paschall
(74) *Attorney, Agent, or Firm*—Wolf, Greenfield & Sacks, P.C.

(57) ABSTRACT

This invention relates to a plasma focus source for generating radiation at a selected wavelength, the invention involving producing a high energy plasma sheathe which moves down an electrode column at high speed and is pinched at the end of the column to form a very high temperature spot. An ionizable gas introduced at the pinch can produce radiation at the desired wavelength. In order to prevent separation of the plasma sheathe from the pinch, and therefore to prolong the pinch and prevent potentially damaging restrike, a shield of a high temperature nonconducting material is positioned a selected distance from the center electrode and shaped to redirect the plasma sheathe to the center electrode, preventing separation thereof. An opening is provided in the shield to permit the desired radiation to pass substantially unimpeded.

13 Claims, 4 Drawing Sheets

PLASMA FOCUS RADIATION SOURCE

RELATED INVENTIONS

Figure 1:
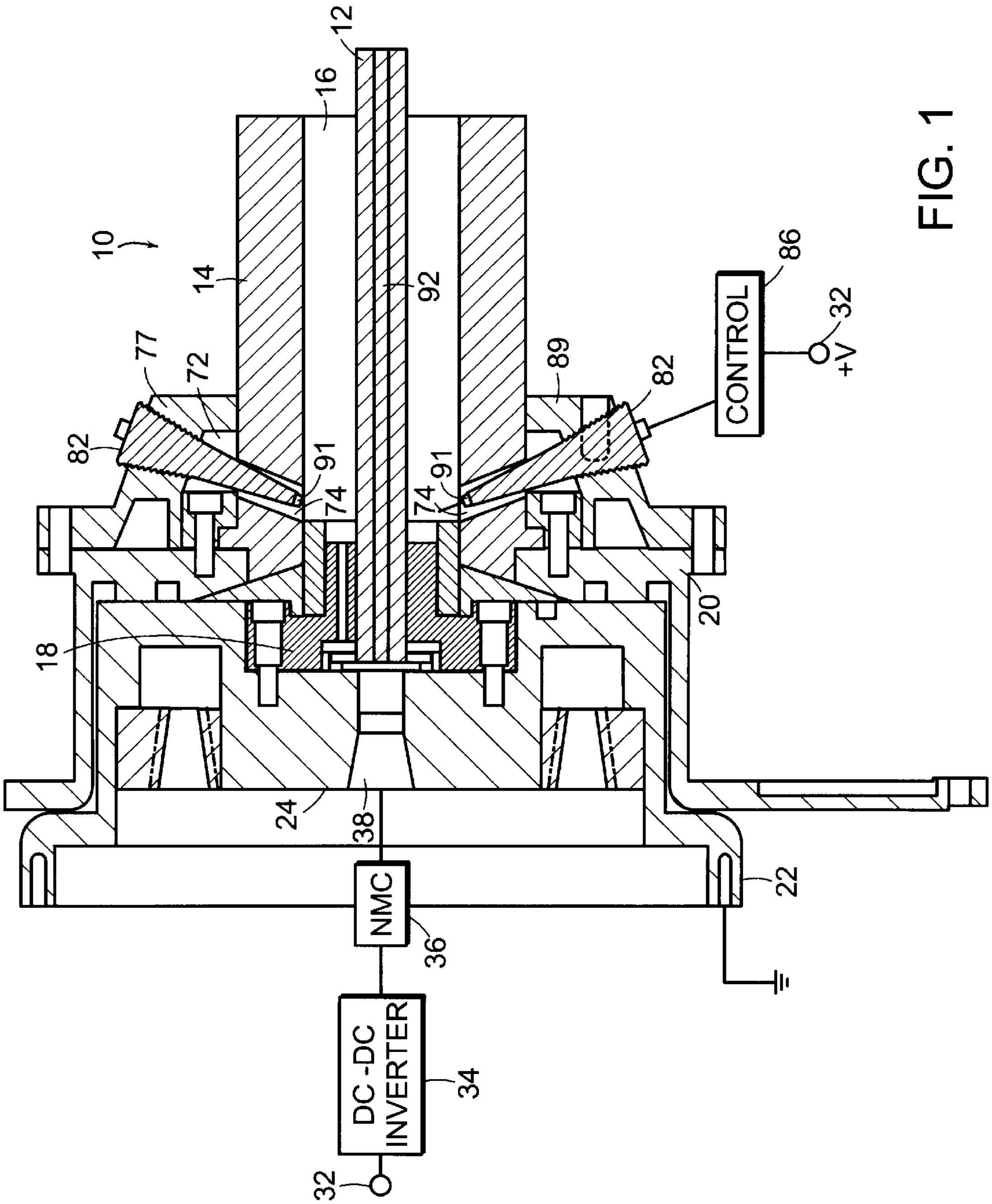

This application is a continuation-in-part of application Ser. No. 09/187,436 filed Nov. 6, 1998, now U.S. Pat. No. 6,084,198, which is in turn a continuation-in-part of Ser. No. 08/847,434, filed Apr. 28, 1997 now U.S. Pat. No. 5,866,871 issued Feb. 2, 1999, the parent application, and the parent patent both being incorporated herein by reference.

FIELD OF THE INVENTION

This invention relates to plasma focused radiation sources, and more particularly to such a radiation source producing extreme ultraviolet (EUV) and/or soft x-ray radiation at a high pulse repetition frequency (PRF).

BACKGROUND OF THE INVENTION

The parent patent and the parent application both describe a plasma gun which may, among other things, be utilized to generate radiation in the EUV and soft x-ray bands with high reliability and at a PRF in excess of approximately 100 Hz, preferably in excess of 500 Hz, and preferably 1000 Hz or more for lithography and other applications requiring generation of such radiation. More specifically, the plasma gun of the parent application/patent involves a center electrode and an outer electrode substantially coaxial with the center electrode, a coaxial column being formed between the electrodes. A selected gas is introduced into the column through an inlet mechanism and a plasma initiator was provided at the base end of the column. A solid state high repetition rate pulse driver is provided which is operable on pulse initiation at the base of the column to deliver a high voltage pulse across the electrodes, the plasma expanding from the base of the column and off the end thereof. The pulse voltage and electrode lengths were selected such that the current for each voltage pulse is substantially at its maximum as the plasma exits the column. The outer electrode for this plasma gun embodiment is preferably the cathode electrode and may be solid or may be in the form of a plurality of substantially evenly spaced rods arranged in a circle. The inlet mechanism provides a substantially uniform gas fill in the column, resulting in the plasma being initially driven off the center electrode, the plasma being magnetically pinched as it exits the column to provide a very high temperature at the end of the center electrode. A selected gas/element fed to the pinch as part of the ionized gas, through the center electrode or otherwise, is ionized by the high temperature at the pinch to provide radiation at a desired wavelength. The wavelength is achieved by careful selection of various plasma gun parameters, including the selected gas/element fed to the pinch, current from the pulse driver, plasma temperature in the area of the pinch, and gas pressure at the column.

While radiation sources of the type indicated above, as described in far greater detail in the parent application and patent, can provide useful radiation at a desired wavelength, the high velocity of the plasma being driven down the column and off the center electrode can cause a problem which significantly limits the usefulness of such sources. In particular, temperatures at the pinch in the range of 100 eV (i.e., about 11,000° C.) to 1000 eV, depending on the desired frequency of radiation, require magnetic compression fields which are sufficient to drive the plasma to velocities of several centimeters per microsecond. Plasmas moving at these velocities down the center conductor and off the end forming the pinch tend to continue moving out into space away from the end of the center conductor, the plasma sheath eventually losing electrical connection to the pinch. This prematurely ends the pinch after as little as 100 nanoseconds and also results in a large voltage transient in the thousands of volts range, resulting in a restrike which can severely damage the electrodes.

Since a discharge can last for several microseconds, if premature loss of electrical connection between the plasma sheath and the electrode could be eliminated, the pinch lifetime could be extended dramatically and the potentially damaging restrike eliminated. This could result in significantly increased output efficiency for the plasma source and a greatly expanded electrode lifetime for the source, thus reducing source down time and maintenance, both of which can be expensive in for example a lithographic application. Significantly better performance at lower costs can thus be obtained.

Further, while materials to be fed to the pinch to achieve certain wavelengths of output were suggested in the parent application, a specific material for providing radiation at the desirable one nanometer wavelength was not specifically indicated.

SUMMARY OF THE INVENTION

In accordance with the above, this invention provides a high PRF radiation source at a selected wavelength which source includes a center electrode, an outer electrode substantially coaxial with the center electrode, a coaxial column being formed between the electrodes, which column has a closed base end and an open exit end; an inlet mechanism for introducing a selected gas into the column; a plasma initiator at the base end of the column; a solid state high repetition rate pulse driver operable on plasma initiation at the base of the column for delivering a voltage pulse across the electrodes, the plasma expanding from the base end of the column and off the exit end thereof; the pulse voltage and electrode lengths being such that the current for each pulse is at substantially its maximum as the plasma exits the column; the inlet mechanism providing a substantially uniform gas fill in the column, resulting in the plasma being initially driven off the center electrode, the plasma being magnetically pinched as it exits the column, raising the temperature at the end of the center electrode sufficient to cause an ionizable element appearing at the end of the center electrode to produce radiation at at least the selected wavelength; and a component for redirecting plasma driven of the center electrode back toward the center electrode without substantially affecting passage of the radiation. For preferred embodiments, the component which redirects is a shield of a high temperature, non-conductive material positioned a selected distance from the exit end of the center electrode and shaped to reflect plasma impinging thereon back toward the center electrode, the shield having an opening positioned to permit the radiation to pass therethrough. For preferred embodiments, the selected distance that the shield is spaced from the center electrode is no more than approximately 2R, where R is the radius of the center electrode, and is not less than approximately R. The shape of the shield may for example be generally spherical, generally conical, or generally parabolic. The opening for permitting passage of radiation is preferably substantially circular and located at substantially the center of the shield. More specifically, the opening is sized and positioned such that radiation exiting the center electrode at an angle of ±15° from the axis of the center electrode passes through the opening. The material for the shield is preferably at least one of a high temperature ceramic, glass, quartz and/or sapphire, the material for a preferred illustrative embodiment being $Al_2O_2$ (aluminum oxide).

In accordance with another aspect of the invention, a high PRF source of radiation at approximately 1 nm is provided which includes a center electrode, an outer electrode substantially coaxial with the center electrode, a coaxial column being formed between the electrodes, which column has a closed base end and an open exit end; an inlet mechanism for introducing a selected gas into the column; a solid state high repetition rate pulsed driver operable on plasma initiation at the base of the column for delivering a high voltage pulse across the electrodes, the plasma expanding from the base end of the column and off the exit end thereof, the current for each voltage pulse initially increasing to a maximum and then decreasing to zero, the pulse voltage and electrode lengths being such that the current for each pulse is at substantially its maximum as the plasma exits the column, the inlet mechanism providing a substantially uniform fill in the column and ionizable sodium being applied to the pinch, the temperature of the pinch being sufficient to cause the sodium to emit radiation of at least said approximately 1 nm wavelength. A shield of the type previously described is preferably utilized with such radiation source.

The foregoing other objects, features and advantages of the invention will be apparent from the following and more particular description of preferred embodiments of the invention as illustrated in the accompanying drawings, like reference numeral being used for common elements in the various figures.

IN THE DRAWINGS

Figure 2A:
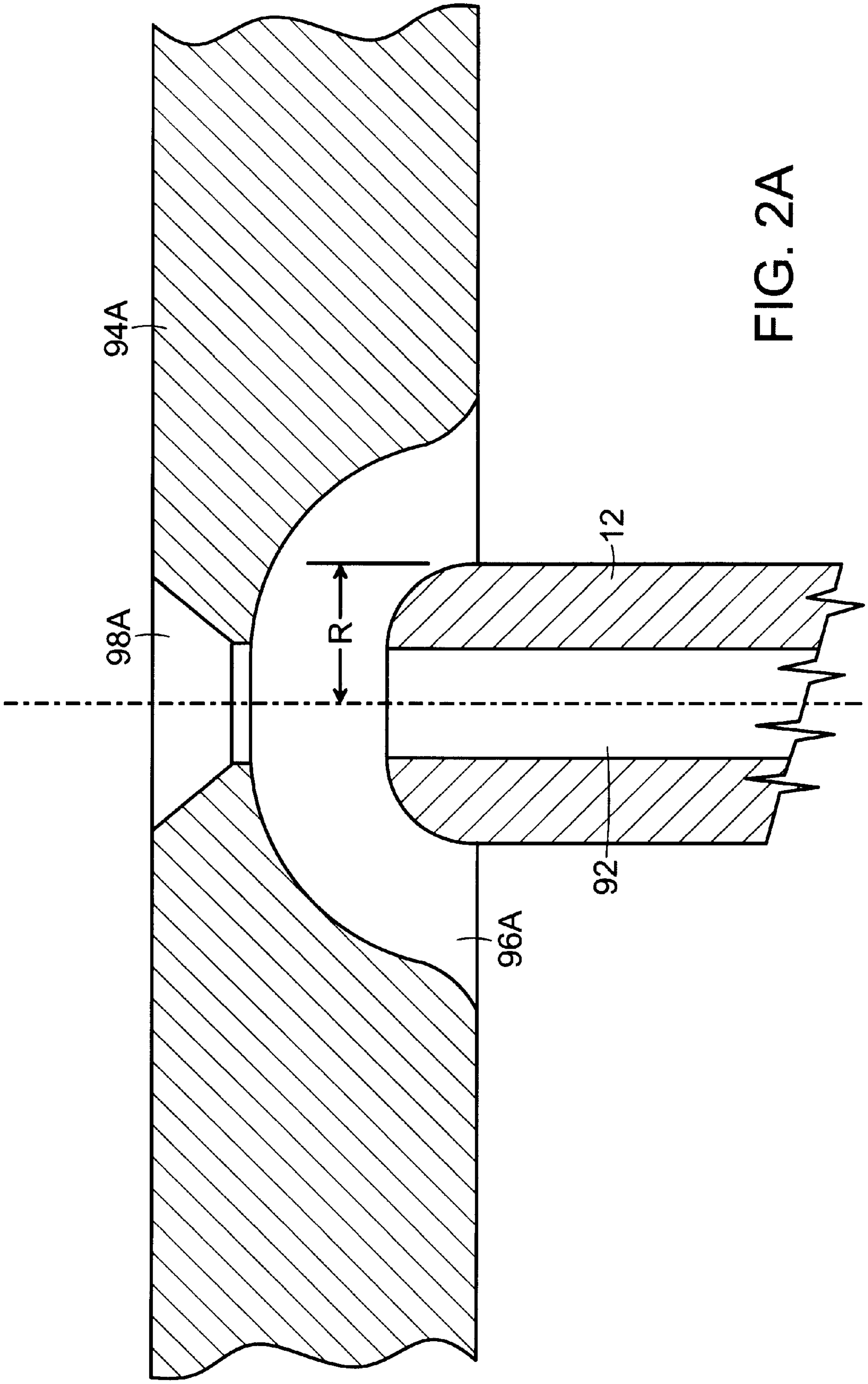
Figure 2B:
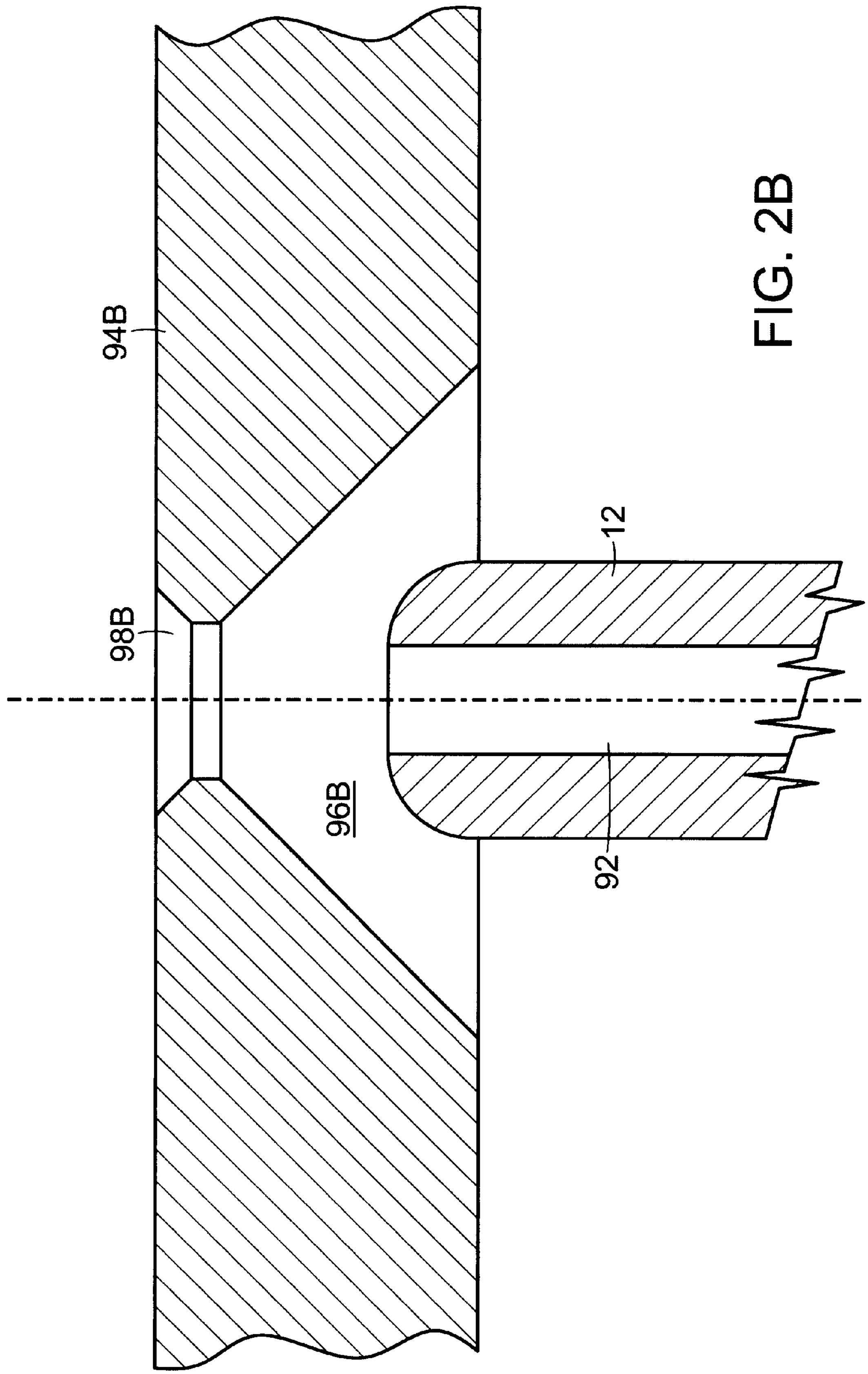
Figure 2C:
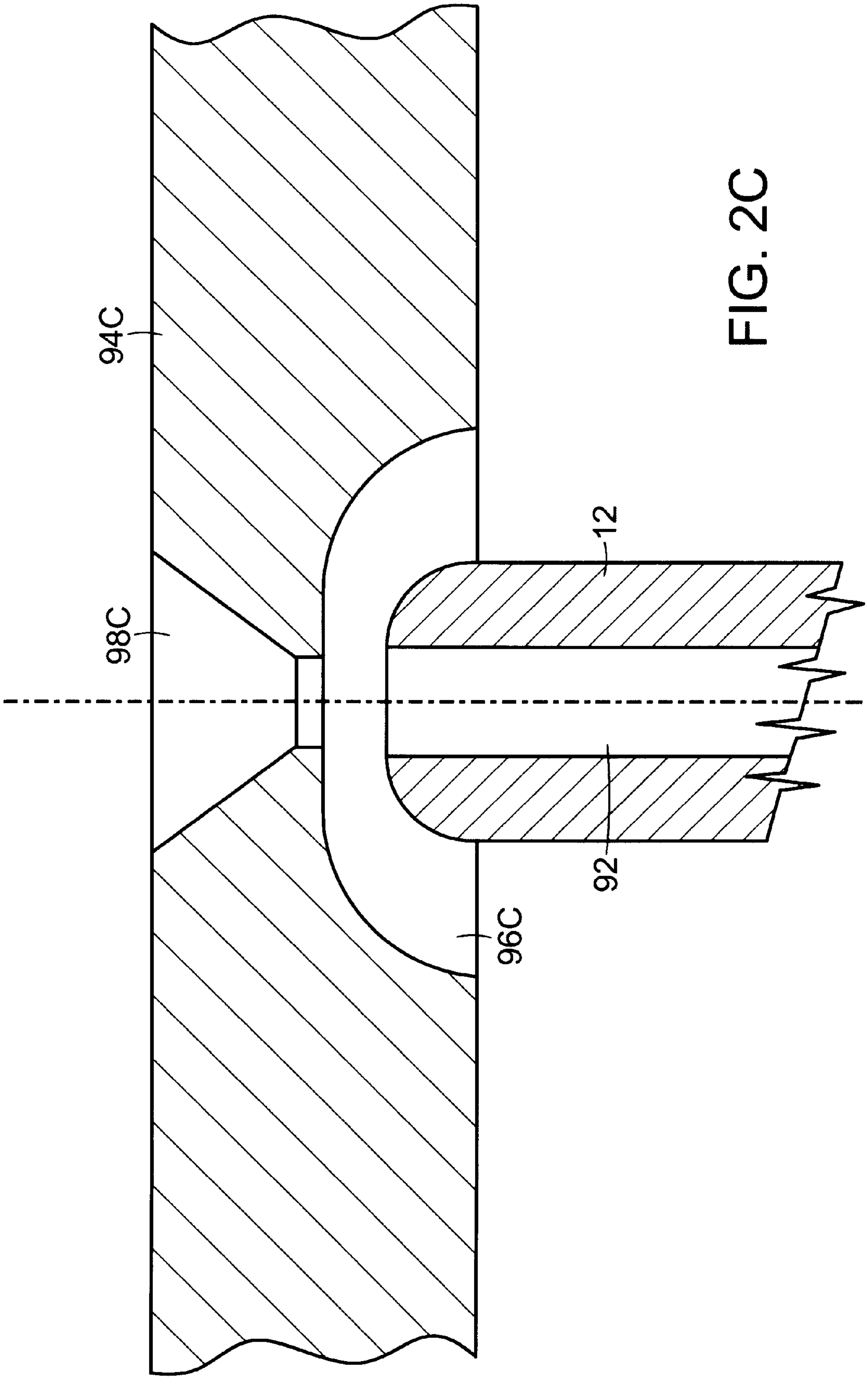

FIG. 1 is a semi-schematic, semi-side cut-away view of a radiation source of the parent application/patent; and FIGS. 2A–2C are enlarged side sectional views illustrating the end of the center electrode and the shield for a spherical, conical and parabolic embodiment of the invention, respectively.

DETAILED DESCRIPTION

FIG. 1 illustrates an exemplary radiation source 10 of the parent patent/application. The source includes a center electrode 12, which may be the positive or negative electrode, but is preferably the anode, and a concentric cathode, ground or return electrode 14, a channel 16 having a generally cylindrical shape being formed between the two electrodes. Channel 16 is defined at its base by an insulator 18 in which center electrode 12 is mounted. Outer electrode 14 is mounted to a conductive housing member 20 which is connected through a conductive housing member 22 to ground. Center electrode 12 is mounted at its base end in an insulator 24. Electrodes 12 and 14 may for example be formed of thoriated tungsten, titanium or stainless steel. A positive voltage may be applied to center electrode 12 from a DC voltage source 32 through a DC—DC inverter 34, a non-linear magnetic compressor (NMC) 36 and a terminal 38 which connects to center electrode 12. Solid state circuitry suitable for use in DC-DC inverter 34 and for NMC 36 are shown and described in some detail in the before mentioned parent application and patent. NMC circuit 36 is also of a general type taught in U.S. Pat. No. 5,142,146. The descriptions of these prior patents and application are incorporated herein by reference. As discussed in these prior patents/application, drive circuits of this type can be matched to very low impedance loads and can produce complicated pulse shapes if required. The circuits are also adapted to operate at very high PRF's and can be tailored to provide voltages in excess of 1 kv.

An internal gas manifold 72 is provided in a housing 77 for radiation source 10, propellant gas being fed from manifold 72 through a plurality of gas holes 74 formed in cathode 14 to the base of column 16. For a preferred embodiment, holes 74 are evenly spaced around the periphery of column 16. While the presence of holes 74 at the base of the column results in significantly increased pressure in the area of these holes near the base of column 16, and thus in plasma initiation at this place in the column, it is preferable, particularly for high PRF applications, that trigger electrodes 82 also be provided to assure both uniformity and timeliness of plasma initiation. Trigger electrodes 82 are fired by a separate drive circuit 86 which receives voltage from source 32, but is otherwise independent of inverter 34 and NMC 36. A suitable drive and control circuit 86 involving two non-linear compression stages separated by an SCR is discussed in the parent application, the SCR being used to control initiation of plasma discharge. Each trigger electrode 82 is a spark-plug-like structure having a screw section which fits in an opening 89 in housing 77 and is screwed therein to secure the electrode in place. The forward end of electrode 82 has a diameter which is narrower than that of the opening so that propellant gas may flow through holes 74 around the trigger electrode. The trigger element 91 of the trigger electrode extends close to the end of hole 74 adjacent column 16, but preferably does not extend into column 16 so as to protect the electrode against the plasma forces developed in column 16.

While the trigger electrode 82 and plasma electrodes 12 and 14 are both fired from common voltage source 32, the drive circuits for the two electrodes are independent and, while operating substantially concurrently, produce different voltages and powers. For example, while the plasma electrodes typically operate at 400–800 volts, the trigger electrode may have a 5 kv voltage thereacross. However, this voltage is present for a much shorter time duration, for example, 10 ns, so that the power is much lower, for example 1/20 joule.

The length of electrodes 12 and 14 are selected such that gas/plasma reaches the end of the electrodes/column when the discharge current is at a maximum. Typically, the voltage applied by NMC 36 will be approaching its half voltage point at this time. Further, outer electrode 14 may be solid or may, for example, consist of a collection of evenly spaced rods which form a circle.

With the electrode lengths and other configurations described above, the magnetic field as the plasma is driven off the end of the center electrode creates a force that drives the plasma into a pinch and dramatically increase its temperature. The higher the current, and therefore the magnetic field, the higher will be the final plasma temperature. Since a static uniform gas fill is typically used, the velocity of the plasma is much higher at center conductor 12 than at the outer conductor 14. The capacitance of the driver, gas density and electrode length are all adjusted to assure that the plasma surface is driven off the end of the center electrode as the current nears its maximum value.

Once the plasma is driven off the end of the center conductor, the plasma surface is pushed inward. The plasma forms an umbrella or water fountain shape. The current flowing through the plasma column immediately adjacent the tip of the center conductor provides an inlet pressure which pinches the plasma column inward until the gas pressure reaches equilibrium with the inward directed magnetic pressure.

Temperatures more than 100 times higher than the surface of the sun can be achieved at the pinch using this technique. Radiation of a desired wavelength is obtained from source 10 by introducing an element, generally in gas state, having a spectrum line at that wavelength at the pinch. While this may be achieved by the plasma gas functioning as the element, or by the element being introduced at the pinch in some other way, for preferred embodiments, the element is introduced through a center channel 92 formed in electrode 12. Center electrode 12 is preferably cooled at its base end by having cooling water, gas or other substance flowing over the portion of the housing in contact therewith. This provides a large temperature gradient with the tip of the cathode which, when a plasma pinch occurs, can be at a temperature of approximately 1200° C. In particular, at high temperatures, radiation intensity is inversely proportional to the fourth power of wavelength (i.e., intensity $\approx 1/\lambda^4=(f/c)^4$; where $\lambda$=the wavelength of the desired radiation, f=the frequency of the desired radiation, and c=the speed of light). Thus, for a given gas/element being fed through channel 92 to the pinch, or otherwise delivered to the pinch, maximum intensity is obtained for the shortest wavelength signal radiated from the element during decay from the $2P \rightarrow 1S$ state, which signal is obtained from atoms of the element in their single electron state (i.e., atoms which have been raised to such a high energy state that all but one atom have been removed from the molecule). For atoms in the single electron state, the wavelength $\lambda$ is given by $\lambda=121.5\ nm/N^2$, where N is the atomic number of the element in chamber 92 which is being vaporized. Using this equation, it can be seen that in order to obtain a desirable 1 nm wavelength radiation, sodium having an atomic number of 11 is the appropriate element for use in channel 92. Elements suitable for use in obtaining other wavelengths of radiation and techniques for achieving radiation at wavelengths other than that of the single electron state for an element are discussed in some detail in the parent application and such discussion is also incorporated herein by reference.

One problem with a plasma source of the type shown in FIG. 1 is that, in order to achieve the desired pinch temperatures, which are in the range of 100 eV to 1000 eV depending on the desired frequency of radiation, magnetic compression fields on the order of Tesla are required which are sufficient to drive the plasma to velocities of several centimeters per microsecond. These high velocities result in the plasma being driven down the center conductor 12 and off the end of the center conductor, the plasma sheath continuing to move out into space away from the end of the center conductor. This results in the plasma sheath eventually losing electrical connection to the pinch, thus ending the pinch and causing a large voltage transient. This voltage transient can result in a high voltage restrike which can severely damage the electrodes. The loss of electrical contact with the plasma sheath also results in a substantial decrease in output efficiency from the source, the pinch lasting for only approximately 100 ns, rather than for the substantially longer duration of the electrical discharge, which can be several microseconds (for example 2–4 microseconds).

In accordance with the teachings of this invention, this problem of plasma separation is overcome by providing a blast shield or focussing device 94 adjacent the exit end of center electrode 12 to redirect the plasma sheath back toward the center electrode. FIGS. 2A–2C show three possible embodiments for such a shield or focusing device (hereinafter collectively referred to as shield) 94A, 94B, 94C which differ from each other primarily in the shape of the focusing cavity 96A, 96B, 96C respectively. In particular, cavity 96A has a generally spherical shape, the cavity being mounted by suitable mounting components (not shown) to outer electrode 14 or to suitable housing components of the source such that the walls of cavity 96A are spaced from the tip of center electrode 12 by a distance sufficient so that there is no contact between the shield and center electrode, but close enough so that redirection of the plasma back to the center electrode occurs before plasma separation. These objectives are achieved with a spacing which is generally in the range of R to 2R, where R is the radius of center electrode 12. However, these distances may vary to some extent depending on other parameters of the source 10. Cavity 96B has a conical shape and cavity 96C has a parabolic shape. The parameters previously indicated for spacing of the cavity from the end of center electrode 12 apply for all three cavity shapes.

While it is desired to prevent separation of the plasma sheath and to contain the sheath with shield 94, it is important that shield 94 not interfere with the exiting of the desired radiation from source 10. Each shield 94 thus has a center opening 98A, 98B, 98C formed at the top of a corresponding cavity and having a center coaxial with the center line of the center electrode. Opening 98 is preferably circular and has a sufficient diameter such that radiation emitted from the pinch at the tip of the center electrode at an angle of ±15°, which is roughly the angle of the emitted radiation, will pass through the opening unobstructed. The upper portion of each opening 98 is tapered outward to facilitate exiting of the radiation while substantially limiting any escape of the plasma sheath.

The material of shield 94 must be a high temperature, non-conductive material capable of withstanding temperatures in the range of approximately 1000° C. and higher. A variety of high temperature ceramics have the desired characteristics, with $Al_2O_3$ (aluminum oxide) being utilized for an illustrative embodiment. Various glasses, quartz and sapphire also have the desired characteristics to serve as the material for shield 94.

While in the discussion above, the plasma redirecting shield has been illustrated for use with a particular configuration of radiation source, the invention is suitable for use with any radiation source where plasma separation is a potential problem and the invention is therefore in no way limited by the specific radiation source configuration of FIG. 1. Similarly, while three cavity configurations have been shown in the figures for redirecting radiation to the cathode, other cavity shapes adapted for performing this function could also be utilized. The specific materials described are also by way of illustration only. Thus, while the invention has been particularly shown and described above with reference to preferred embodiments, the foregoing and other changes in form and detail may be made therein by one skilled in the art while still remaining within the spirit and scope of the invention which is to be defined only by the appended claims.

What is claimed is:

1. A high PRF radiation source at a selected wavelength including;

a center electrode;

an outer electrode substantially coaxial with said center electrode, a coaxial column being formed between said electrodes, which column has a closed base end and an open exit end;

an inlet mechanism for introducing a selected gas into said column;

a plasma initiator at the base end of said column;

a solid state, high repetition rate pulsed driver operable on plasma initiation at the base of said column for delivering a high voltage pulse across said electrodes, the plasma expanding from the base end of the column and off the exit end thereof;

the pulse voltage and electrode lengths being such that the current for each pulse is at substantially its maximum as the plasma exits the column; said inlet mechanism providing a substantially uniform gas fill in said column, resulting in the plasma being initially driven off the center electrode, the plasma being magnetically pinched as it exits the column, raising the temperature at the end of said center electrode sufficient to cause an ionizable element appearing at said end of said center electrode to produce radiation at said selected wavelength; and a component which redirects plasma driven off said center electrode back toward the center electrode, without substantially affecting passage of said radiation.

2. A source as claimed in claim 1 wherein said component which redirects is a shield of a high temperature, non-conductive material positioned a selected distance from said the exit end of said center electrode and shaped to reflect plasm impinging thereon back toward said center electrode, said shield having an opening positioned to permit said radiation to pass therethrough.

3. A source as claimed in claim 2 wherein said selected distance that said shield is spaced from said center electrode is no more than approximately 2R, where R is the radius of the center electrode.

4. A source as claimed in claim 3 wherein said selected distance is not less than approximately R.

5. A source as claimed in claim 2 wherein said shield has a generally spherical shape.

6. A source as claimed in claim 2 wherein said shield has a generally conical shape.

7. A source as claimed in claim 2 wherein said shield has a generally parabolic shape.

8. A source as claimed in claim 2 wherein said opening is a substantially circular opening located at substantially the center of said shield.

9. A source as claimed in claim 8 wherein said opening is sized and positioned such that radiation exiting said center electrode at an angle of approximately ±15° from the axis of the center electrode passes through the opening.

10. A source as claimed in claim 1 wherein said material is at least one of a high temperature ceramic, glass, quartz and sapphire.

11. A source as claimed in claim 10 wherein said material is $Al_2O_3$.

12. A high PRF source for radiation at approximately 1 nm including;

a center electrode;

an outer electrode substantially coaxial with said center electrode, a coaxial column being formed between said electrodes, which column has a closed base end and an open exit end;

an inlet mechanism for introducing a selected gas into said column;

a solid state, high repetition rate pulsed driver operable on plasm initiation at the base of said column for delivering a high voltage pulse across said electrodes, the plasma expanding from the base end of the column and off the exit end thereof, the current for each voltage pulse initially increasing to a maximum and then decreasing to zero, the pulse voltage and electrode lengths being such that the current for each pulse is at substantially its maximum as the plasma exits the column; said inlet mechanism proving a substantially uniform gas fill in said column; and ionizable sodium applied to said pinch, the temperature at said pinch being sufficient to cause said sodium to emit radiation of at least said approximately 1 nm wavelength.

13. A source as claimed in claim 12 including a component which redirects plasma driven off said center electrode back toward the center electrode, without substantially affecting passage of said radiation.

* * * * *